(12) United States Patent
Huang et al.

(10) Patent No.: US 7,571,414 B2
(45) Date of Patent: Aug. 4, 2009

(54) MULTI-PROJECT SYSTEM-ON-CHIP AND ITS METHOD

(75) Inventors: Chun-Ming Huang, Hsinchu (TW);
Chih-Chyau Yang, Chupei (TW);
Jing-Yang Jou, Hsinchu (TW);
Kuen-Jong Lee, Tainan (TW); Lan-Da Van, Miao-Li (TW)

(73) Assignee: National Chip Implementation Center, National Applied Research Laboratories, Hsinchu (TW)

( * ) Notice: Subject to any disclaimer, the term of this patent is extended or adjusted under 35 U.S.C. 154(b) by 168 days.

(21) Appl. No.: 11/453,103

(22) Filed: Jun. 15, 2006

(65) Prior Publication Data

US 2007/0294658 A1 Dec. 20, 2007

(51) Int. Cl.
*G06F 17/50* (2006.01)
(52) U.S. Cl. .............................. 716/17; 716/18; 716/6
(58) Field of Classification Search .................. 716/17, 716/18, 6
See application file for complete search history.

(56) References Cited

U.S. PATENT DOCUMENTS

| | | | | |
|---|---|---|---|---|
| 5,841,663 A * | 11/1998 | Sharma et al. | ................. | 716/18 |
| 5,910,898 A * | 6/1999 | Johannsen | ..................... | 716/1 |
| 6,269,467 B1 * | 7/2001 | Chang et al. | ................... | 716/1 |
| 6,456,961 B1 * | 9/2002 | Patil et al. | ..................... | 703/14 |
| 6,567,957 B1 * | 5/2003 | Chang et al. | ................... | 716/4 |
| 6,574,778 B2 * | 6/2003 | Chang et al. | ................... | 716/1 |
| 6,594,800 B2 * | 7/2003 | Chang et al. | ................... | 716/1 |
| 6,629,293 B2 * | 9/2003 | Chang et al. | ................... | 716/4 |
| 6,631,470 B2 * | 10/2003 | Chang et al. | ................... | 716/3 |
| 6,678,645 B1 * | 1/2004 | Rajsuman et al. | ............ | 703/20 |
| 6,694,501 B2 * | 2/2004 | Chang et al. | ................. | 716/10 |
| 6,698,002 B2 * | 2/2004 | Chang et al. | ................... | 716/4 |
| 6,857,110 B1 * | 2/2005 | Rupp et al. | .................... | 716/4 |
| 7,051,304 B2 * | 5/2006 | Bozkaya et al. | ................ | 716/5 |
| 7,366,650 B2 * | 4/2008 | Nightingale et al. | .......... | 703/26 |
| 7,366,652 B2 * | 4/2008 | Wang et al. | ................... | 703/28 |

(Continued)

FOREIGN PATENT DOCUMENTS

CN 1609862 A * 4/2005

(Continued)

OTHER PUBLICATIONS de Mello et al., "Tangram: Virtual Integration of IP Components in a Distributed CoSimulation Environment", IEEE Design & Test of Computers, vol. 22, No. 5, Sep.-Oct. 2005, pp. 462-471.*

(Continued)

*Primary Examiner*—Phallaka Kik
(74) *Attorney, Agent, or Firm*—Birch, Stewart, Kolasch & Birch, LLP

(57) ABSTRACT

A multi-project system-on-chip bench by integrating multiple system-on-chip projects into a chip, which uses a system chip bench, therefore, microprocessor, bus, embedded memory, peripheral component and input/output port is used together by those system-on-chip projects and the average cost of each system-on-chip is thus reduced. Moreover, this invention proposes a design method for multi-project system-on-chip bench, it let the user can effectively manage available data and verification environment in each design process flow hierarchy and in turn an easy-to-use design process flow is thus derived.

4 Claims, 14 Drawing Sheets

U.S. PATENT DOCUMENTS

| | | | |
|---|---|---|---|
| 7,434,182 B2 * | 10/2008 | Brinson et al. | 716/4 |
| 7,451,426 B2 * | 11/2008 | Pribbernow | 716/18 |
| 2002/0038401 A1 * | 3/2002 | Zaidi et al. | 710/305 |
| 2007/0011642 A1 * | 1/2007 | Pribbernow | 716/18 |

FOREIGN PATENT DOCUMENTS

| | | | |
|---|---|---|---|
| KR | 2004076708 A | * | 9/2004 |
| WO | WO 9962009 A1 | * | 12/1999 |
| WO | WO 02103584 A2 | * | 12/2002 |

OTHER PUBLICATIONS

Keating, "The IP Quality Revolution", Proceedings of 5th International Symposium on Quality Electronic Design, 2004, pp. 151-155.*

Schmitt et al., "Verification of a Microcontroller IP Core for System-on-Chip Designs Using Low-Cost Prototyping Environments", Proceedings of Design, Automation and Test in Europe Conference and Exhibition, vol. 3, Feb. 16-20, 2004, pp. 96-101.*

* cited by examiner

MULTI-PROJECT SYSTEM-ON-CHIP AND ITS METHOD

DETAILED DESCRIPTION OF THE CURRENT INVENTION

1. Background of the Current Invention

This invention relates to a Multi-Project System-on-Chip (MP-SoC) bench.

2. Prior Art

Under the influence of advanced Integrated Circuited (IC) manufacturing and the automation technology of electronic design, the design technology of System-on-Chip becomes more and more practical, SoC can integrate a complete system on a single chip; meanwhile, it has much lower power, lower cost and higher speed than that of the conventional design. Among all the current SoC design researches, bench type system-on-chip design method is the most frequently used design method, bench is like the framework of a building, it is composed by overall allocation and the software and hardware Silicon Intellectual Property (IP) block interconnected on the chip. Based on the basis of good definition and well recognized system bench, the designer only needs to focus on the functional characteristics and the writing of embedded software of special silicon intellectual property block, therefore, even a small scale design team can design a complete system-on-chip.

Although it is very useful for the researchers of academic system-on-chip to use bench type system-on-chip design method, however, due to high production cost, the design plan of academic system-on-chip is very difficult to have chance for the implementation of silicon prototype. The system-on-chip designed in academy usually occupies very large chip area, most of the devices in such system-on-chip, for example, microprocessor, internal memory, bus architecture and output/input port, etc. are all designed by third person, therefore, under the consideration of limited budget, such system-on-chip has very low chance of implementation, only Virtual Prototyping verification or Rapid Prototyping verification can be used to verify SoC, for example, Seamless CVE software of Mentor Graphics and ConvergenSC software of CoWare, wherein virtual prototyping verification of system-on-chip is performed through the providing of software and hardware co-verification environment, moreover, for products such as Virtex II of Xilinx, Nios II of Altera and System Explorer MP4CF of Aptix, the prototype physical implementation of system-on-chip is performed through the providing of FPGA hardware development system which comprises of embedded processor, however, such two verification methods eventually can not provide real SoC verification. In order to meet the strong demand of the implementation of SoC, Multi-Project Chip (MPC) service is thus adopted by many organizations such as: National Applied Research Laboratories, National Chip Implementation Center (CIC) in Taiwan, CMP in France, IDEC in Korea, the idea is executed through the concept of the share of photo mask so that the photo mask and chip manufacturing cost is reduced, however, MPC service still can not reach the reduction in silicon area for the realization of single system-on-chip.

Therefore, a multi-project system-on-chip bench which integrates multiple SoC projects in order to reduce the silicon area and average cost of each SoC project is thus desired.

SUMMARY OF THE INVENTION

One purpose of the current invention is to propose a MP-SoC bench so that devices such as: microprocessor, bus can be used by multiple system-on-chip projects.

Another purpose of the current invention is to integrate multiple system-on-chip projects into a MP-SoC so that the average cost of each system-on-chip can be reduced.

Yet another purpose of the current invention is to provide a design method for MP-SoC.

According to the current invention, a MP-SoC bench (including microprocessor, chip bus architecture, memory, peripheral devices and output/input port, etc.) is shared among many SoC projects, therefore, the silicon area and manufacturing cost of single SoC project can be obviously reduced. In addition, this invention further proposes a design method for MP-SoC bench in order to help the designer to manage current data and install verification environment effectively in each design process flow level.

PREFERRED EMBODIMENT OF THE CURRENT INVENTION

FIG. 1 shows the chip area of the realization of N different SoC projects and the realization of N SoC projects using MP-SoC concept, respectively. Assume that the realization of single SoC project 10 needs chip area of 4 units, as shown in the left side of FIG. 1, wherein 3 units are shared zone 14 including devices such as microprocessor, bus architecture, memory, etc. which can be shared by other SoC projects; 1 unit is special IP zone 12 which can not be shared by other SoC project 10 in SoC project 10. To realize individually N system-on-chip projects 10 will need 4N units of chip area. For MP-SoC concept, as shown in the right side of FIG. 1, special IP zone 12 of N SoC projects are integrated into MP-SoC 15, it shares shared zone 14 of 3 units, this MP-SoC 15 which integrates N SoC projects will need chip area of N+3 units.

Since it will needs some additional chip area for the real integration of N special IP zone 12, therefore, the following formula is used to further explain it:

Assume there is a total of N SoC projects, $A_{total}$ means the total area needed to realize individually N SoC projects; $A_{shared}$ means the shared device area in each SoC project, that is, the future available area on the bench; $A_{IP,i}$ means the special IP area of ith SoC project; $A_{overhead1,i}$ means the additional area needed to integrate the special IP of ith SoC project into individual SoC. Based on the above assumption, the area $A_{total}$ needed to realize individually N SoC projects is $$A_{total} = N \times A_{shared} + \sum_{i=1}^{N} A_{IP,i} + \sum_{i=1}^{N} A_{overhead1,i} \quad (1)$$

If MP-SoC concept is used to design these N SoC projects, through the shared SoC bench area ($A_{shared}$), the entire chip cost will be reduced by about $(N-1) \times A_{shared}$ area units, however, the additional area needed $A_{overhead2,i}$ to integrate the special IP of ith SoC project will need to be taken into account, therefore, we can obtain the MP-SoC area needed $A_{MP-SoC}$ by using MP-SoC concept to realize N SoC projects, this is as in formula 2, the saved area $A_{saving}$ is as shown in formula 3

$$A_{MP-SoC} = A_{shared} + \sum_{i=1}^{N} A_{IP,i} + \sum_{i=1}^{N} A_{overhead2,i} \quad (2)$$

$$A_{saving} = A_{total} - A_{MP-SoC} \quad (3)$$

Therefore, the rate of area saved $R_{saving}$ is $$R_{saving} = \frac{A_{saving}}{A_{total}} \quad (4)$$

$$= \frac{A_{total} - A_{MP-SoC}}{A_{total}}$$

$$= \frac{A_{total} - A_{shared} - \sum_{i=1}^{N} A_{IP,i} - \sum_{i=1}^{N} A_{overhead2,i}}{A_{total}}$$

$$= \frac{(N-1) \times A_{shared} - \sum_{i=1}^{N}(A_{overhead2,i} - A_{overhead1,i})}{A_{total}}$$

$$= \frac{(N-1) \times A_{shared} - \sum_{i=1}^{N} A_{overhead,i}}{A_{total}}$$

$A_{overhead,I}$ is the difference between $A_{overhead2,I}$ and $A_{overhead1,i}$, we can know from formula 4 that the larger the N value, the more the chip area saved. For example, put the assumption in FIG. 1 into formula 4, that is, $A_{overhead2,i}=0$, $A_{overhead1,i}=0$, $A_{shared}=3$ and $A_{IP,i}=1$, we can obtain the rate of area saved as in FIG. 1, $R_{saving}$, that is $$R_{saving} = \frac{(N-1) \times 3}{N \times 4} \quad (5)$$

When there are 8 SoC projects to be integrated, that is, N=8, according to formula 5, we can obtain area saving rate of 66%. We know from the above description that the share of a bench through MP-SoC concept, the average cost of each SoC project can be greatly reduced.

Since each MP-SoC system needs to integrate multiple SoC projects and each SoC project further comprising of individual software and hardware, the design and verification work of MP-SoC system is thus more difficult and time-consuming than that of normal SoC design, therefore, how to integrate and manage the automation software tool of electronic design to be used for the design of MP-SoC system and how to build a complete and easy-to-use MP-SoC design and verification environment and process flow has become the top priority task. In order to let user to add, delete, revise and verify the feasibility of software and hardware fast and easily, bench type SoC design is adopted in the current invention, however, if the conventional bench type SoC design method is adopted directly to realize MP-SoC system, there are still many difficulties in verification and integration, thus, in order to solve these issues, this invention integrates automation software tool of electronic design and develops MP-SoC design process flow as in FIG. 2, the verification environment as needed in the process flow is also built.

FIG. 2 is the MP-SoC design process flow of the current invention, in the beginning, each SoC project designer participating MP-SoC design system should build together test environment plan 20 and develop system architecture 22, at this stage, all the hardware components and interfaces on MP-SoC system are all completely designed, next, the implementation bench 28 is designed and the verification environment 30 needed to design the entire chip will be made, in the mean time, system spec 24 and IP spec 26 are specified, the designer of each SoC project should perform IP block design 32 according to IP spec 26 so as to design special IP 34 and make sure each special IP 34 can operate under verification environment 30. When the special IP 34 in SoC project is designed completely and operated well in the verification environment 30, a system integrator will then collect all the special IP 34 into the implemented bench 28 to perform logic level design 36 in order to generate netlist 38 and further perform physical level design 40, finally, the completed layout drawing 42 will be released.

According to the process flow in FIG. 2, this invention proposes an embodiment to explain in detail the embodiment method of development system architecture 22, IP block design 32, logic level design 36 and physical level design 40 of FIG. 2. FIG. 3 shows the process flow for the implementation of development system architecture 22 by the current embodiment, first, perform spec study 22 on the special IP of SoC project and collect the system requirement 222 (requirement such as the memory space needed) of each special IP, plan the memory map 224, arbitrator mechanism 226 and isolation mechanism 228 for MP-SoC system, build hardware description language bench 230 for MP-SoC, finally, the implementation bench 28 and verification environment 30 needed for the realization of MP-SoC system as in FIG. 2 is thus developed, in the meantime, system spec 24 and IP spec 26 are installed, this includes limitations such as: the memory space needed for special IP, internal memory size and the quantity of external leads, these collected information such as: special IP spec and system requirement will be applied in the process flow of next IP block design 32, logic level design 36 and physical level design 40.

FIG. 4 is the IP block design process flow for the implementation of IP block design 32 of the current embodiment, it is provided to be used by each SoC project designer in designing special IP 34. Each SoC project designer follows IP spec 26 and the special IP functional requirement 320 of FIG. 2 to perform special IP Register Transfer Level (RTL) design, first, RTL coding 322 for special IP is performed which generates special IP RTL program code 324, meanwhile, the correctness is verified through special IP RTL simulation 326, moreover, IP spec 26 is followed to add packaging circuit 328 into the RTL program code 324 of special IP, special IP+ packaging circuit RTL 330 is then generated, then the special IP+ packaging circuit RTL 330 is integrated into verification environment 30 to perform system RTL simulation 332 of single special IP, each SoC project designer the follows IP spec 26 to perform IP design constraints writing 334, then IP design constraints 336 and special IP+ packaging circuit RTL 330 are sent to synthesizer for Logic Synthesis 338 and to generate IP Pre-layout Gate-level Netlist 340, then the IP Pre-layout Gate-level Netlist 340 is integrated into verification environment 30 to perform system gate-level simulation verification 342, finally, each SoC project designer will pass individual special IP+ packaging circuit RTL 330, IP design constraints 336 and IP Pre-layout Gate-level Netlist 340 to system integrator to perform the system integration 344 of entire MP-SoC. Refer to FIG. 2, in this verification stage, each special IP 34 will perform single and special IP verification through implementation bench 28 and verification environment 30 in order to verify that each special IP can function properly in MP-SoC system bench.

FIG. 5 is the implementation process flow of logic level design 36 of FIG. 2 for the current embodiment, please refer to FIG. 4, when the special IP 34 of each SoC project is designed and verified, the next step is to integrate the special IP+ packaging circuit RTL 330 of all SoC projects and to perform the system RTL simulation 360 of the entire chip and to generate system design constraints 362, then, according to system design constraints 362, IP design constraints 336, IP pre-layout gate-level netlist 340 and the system RTL program code generated during system RTL simulation 360, logic synthesis 364 is then performed, and pre-layout gate-level netlist 366 of the entire system is then generated, furthermore, perform Timing Analysis 368 of pre-layout gate-level netlist to get timing report and Standard Delay Format (SDF) file 370, finally, integrate timing report and SDF file 370 into verification environment 30 to perform all IP system gate-level simulation 372.

After the completion of logic level design 36 of the current embodiment is completed, enter the physical level design 40 process flow as in FIG. 6, Placement & Route tool (P&R) 400 will then perform automatic layout according to system design constraints 362, system pre-layout gate-level netlist 366 and IP design constraints 336 as in FIG. 5 to generate mapped chip post-layout gate-level netlist 402 and layout drawing 404 of GDSII (Graphic Data System II) format, then through RC extraction 406 to get interconnect RC 408 and to perform timing analysis 410 so as to obtain timing report and SDF file 412, then perform the gate-level simulation 414 for all IP systems in accordance with verification environment 30, finally, physical verification 416 is performed and the completed layout drawing 42 is sent to wafer foundry.

After the above process flows, a test chip 44 is designed in the current embodiment, its system block diagram is as shown in FIG. 7, the test chip 44 integrates 8 SoC projects, these eight SoC projects have the following special IP: Advanced Encryption Standard (AES) processing core 4448 to be used in communication system, Discrete Wavelet Transform (DWT) processing core 4450 to be used in static image compression, A7 Reduced Instruction Set Computer (RISC) processor 4436, Scaled Discrete Cosine Transform type IV (SDCTIV) processing core 4438 used in MP3 application and Inverse Modified Discrete Cosine Transform (IMDCT) processing core 4440, Advanced Test Bench 1 (ATP1) processing core 4428 used for SoC test and ATP2 processing core 4430, and Motion Estimation (ME) processing core 4422 used for dynamic image compression. In addition to these eight SoC projects, it also includes synergistic processor 4412, therefore, the application scope of test chip 44 includes communication, image processing and image/voice compression, test chip 44 uses chip bus standard. The commonly seen bus standards include the Advanced Microcontroller Bus Architecture (AMBA) of ARM, the On-Chip Peripheral Bus (OPB) of IBM and the Processor Local Bus (PLB), Peripheral Interconnect Bus (PIbus) of OMI, PIbus2 and Mbus and PalmBus of PALMCHIP, etc. The AMBA of ARM adopted by the current embodiment includes ARM high performance bus (AHB) 4432 which is used to be connected to high performance system device and ARM peripheral bus (APB) 4452 used to be connected to low cost peripheral component. In other embodiment, bus architecture can also use other chip bus standard. AHB 4432 is connected to ARM922T core processor 4410 through packaging circuit 4416, the system devices for other connection on AHB 4432 includes External memory interface 4414, reset controller 4418, test interface controller 4420, ME processing core 4422, Multiplexer of Master to Slave (MuxM2S) 4424, Multiplexer of Slave to Master (MuxS2M) 4426, ATP1 processing core 4428, ATP2 processing core 4430, A7 RISC processor 4436, SDCTIV processing core 4438, IMDCT processing core 4440, arbitrator 4442, decoder 4444, internal memory 4446, AES processing core 4448 and DWT processing core 4450. AHB 4432 is connected to APB 4452 through APB bridge 4434, the peripheral devices connected on APB 4452 include interrupt controller 4454, Remap/pause controller 4456, counter 4458 and MuxP2B (Multiplexer of Peripheral to Bridge) 4460. In the out of chip connections, test interface controller 4420 is connected to the test interface outside of the chip, External memory interface 4414 is connected to external device through external bus 4462, ARM922T core processor 4410 and A7 RISC processor 4436 are connected respectively to the debug signals from outside of the chip, interrupt controller 4454 is however connected to interrupt signal and synergistic processor 4412 is connected to ARM922T core processor 4410. External memory interface 4414 are connected to external devices such as: External memory 4464, External memory 4472, terminal simulation module 4468 and test interface driver 4470, wherein external memory 4464 and 4472 are different memory devices, external memory 4464 is an external Read-only Memory (ROM) and Static Random Access Memory (SRAM), external memory 4472 is Flash and SDRAM, they are provided to the users according to their different needs.

In order to meet low cost design consideration, test chip 44 adopts shared memory architecture in order to reduce the cost occupied by the memory, FIG. 8 shows the system memory mapping of test chip 44 having memory space about a total of 4G bits. As shown in the left side of FIG. 8, these 4G bits are planned as internal memory, external Random-Access memory (RAM), ROM, Retry slave, peripheral bus and the memory space to be used by ARM922T test, the special IP of each SoC project uses the zone from 0x6000_0000 to 0x8000_0000, the remaining space is still undefined yet. The memory planning from 0x6000_0000 to 0x8000_0000 is as shown in the left side of FIG. 8, however, in order to meet the need of each special IP and to lower the loading of the decoder, the current embodiment assigns 1 MB of memory space to each special IP, the undefined space can be used by the newly added devices.

Since test chip 44 integrates several special IP, appropriate isolation and arbitration mechanism are thus needed so that each special IP will not affect each other which in turn might lower the system performance, the first thing that needs to be considered is the abnormal need from the Master device of bus. Please refer to FIG. 7, the AHB 4432 on test chip 44 is connected to 6 Masters, these include test interface controller 4420, pause controller (the 1 bit signal pulled out from the re-map/pause controller of APB 4452, not shown in the figure), ATP1 4428, ATP2 4430, ARM922T core processor 4410 and A7 RISC processor 4436. In order to prevent the influence on the overall operation of the system by the abnormal requests sent out by these Masters, the isolation mechanism of test chip 44 is as shown in FIG. 9, which includes four 2-to-1 multiplexers 64, these multiplexers are controlled by the signals from external so as to control what Masters are to operate. Arbitrator 4442 is the arbitrator mechanism of the bus, and the commonly seen bus arbitration mechanisms are: Fixed, Round Robin, Lottery and TDM, the main considerations for the selection of arbitration method are on cost and speed, table 1 shows the needed arbitration area by different arbitration method when it is implemented by TSMC 0.13 μm process, although Round Robin, Lottery and TDM algorithm can provide better performance than that of Fixed, however, in order to obtain lowest area cost, test chip 44 adopts Fixed priority algorithm, TIC 4420 is the first priority selected by arbitrator 4442, pause controller is the second priority, and so on. In another embodiment, arbitrator mechanism uses Round Robin, Lottery or TDM algorithms.

TABLE 1

| Arbitration rule | Fixed | Round Robin | Lottery | TDM |
| --- | --- | --- | --- | --- |
| Area cost (μm²) | 2018 | 2593 | 10211 | 3535 |

The implementation bench of the current embodiment is as shown in FIG. 10, multiple dotted line blocks mean empty blocks 68 reserved for each special IP, the other solid line blocks are the share pats of each special IP. Each SoC project designer needs only to follow system memory to complete their own application programs so as to connect special IP to empty block 68 to perform test. This implementation bench is a plug-and-play bench so that each special IP can be integrated to the bench for test very fast. In addition, terminal simulation module 4468 can provide a window for printing message during the simulation process so as to help the user to debug.

FIG. 11 is the verification environment of the current embodiment which is used by the designer for all kinds of fast heterogeneous application verification. First, application programs are written by assembler language 302 or C language 304, then it is passed to assembler 306 or compiler 308 to be compiled into object file 310, then it is linked by linker 312 into an executable file 314, then a format conversion tool 316 is used to transform it further to ROM or Flash file format 318, these files can then be used to initialize the memory model during the simulation verification process.

FIG. 12 is a photo of test chip 44, it is manufactured by TSMC 0.13 μm 1P8M logic process and packaged with the spec of 256 leads, from FIG. 12 we can see that ARM922T core processor 4410 occupies relatively large chip area out of the entire test chip 44.

In the test chip aspect, two methods are used to test in the current embodiment, the first test uses Agilent 93000 ATE, this test method is to input the acquired test vector of simulation process to the chip and compare the simulation result at the output leads. FIG. 13 shows the carrier board 70 used in the ATE test by test chip 44, the current measured work frequency is 100 MHz. Another test method is experimental board 72 test, FIG. 14 is the experimental board 72 of test chip 44, experimental board 72 is installed with flash memory, SDRAM, Multi-ICE connector, logic analyzer connector and graph generator connector. In the beginning of the test, application software is initialized into flash, then a mainframe computer is used to perform system verification and debugging through ICE interface, during the debugging process, logic analyzer and graph generator can also be connected to assist the debugging process.

BRIEF DESCRIPTION OF THE CURRENT INVENTION

Figure 1:
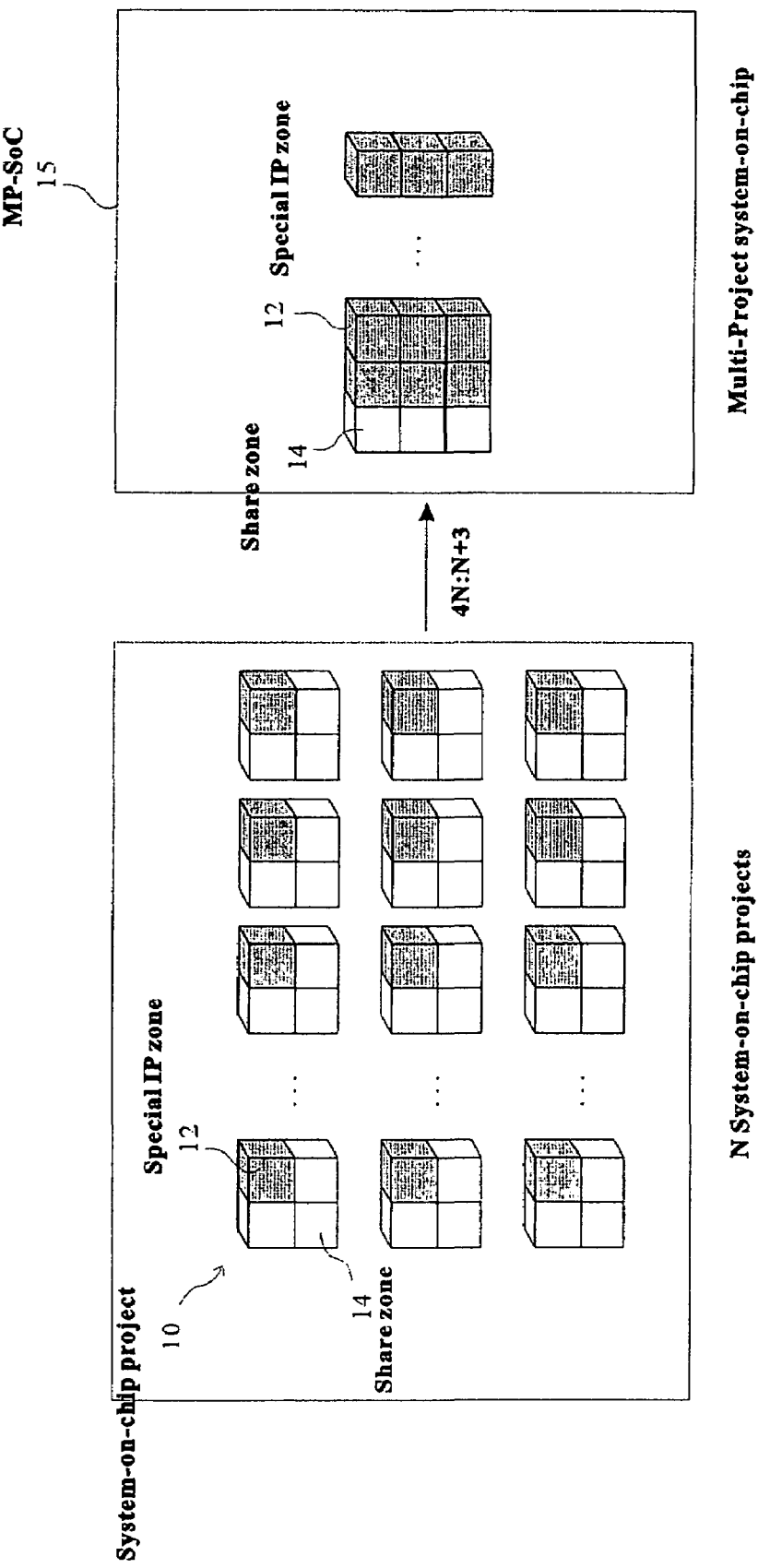
FIG. 1 shows the illustration of chip area for the individual realization of N SoC projects and the realization of N SoC projects using MP-SoC concept.
Figure 2:
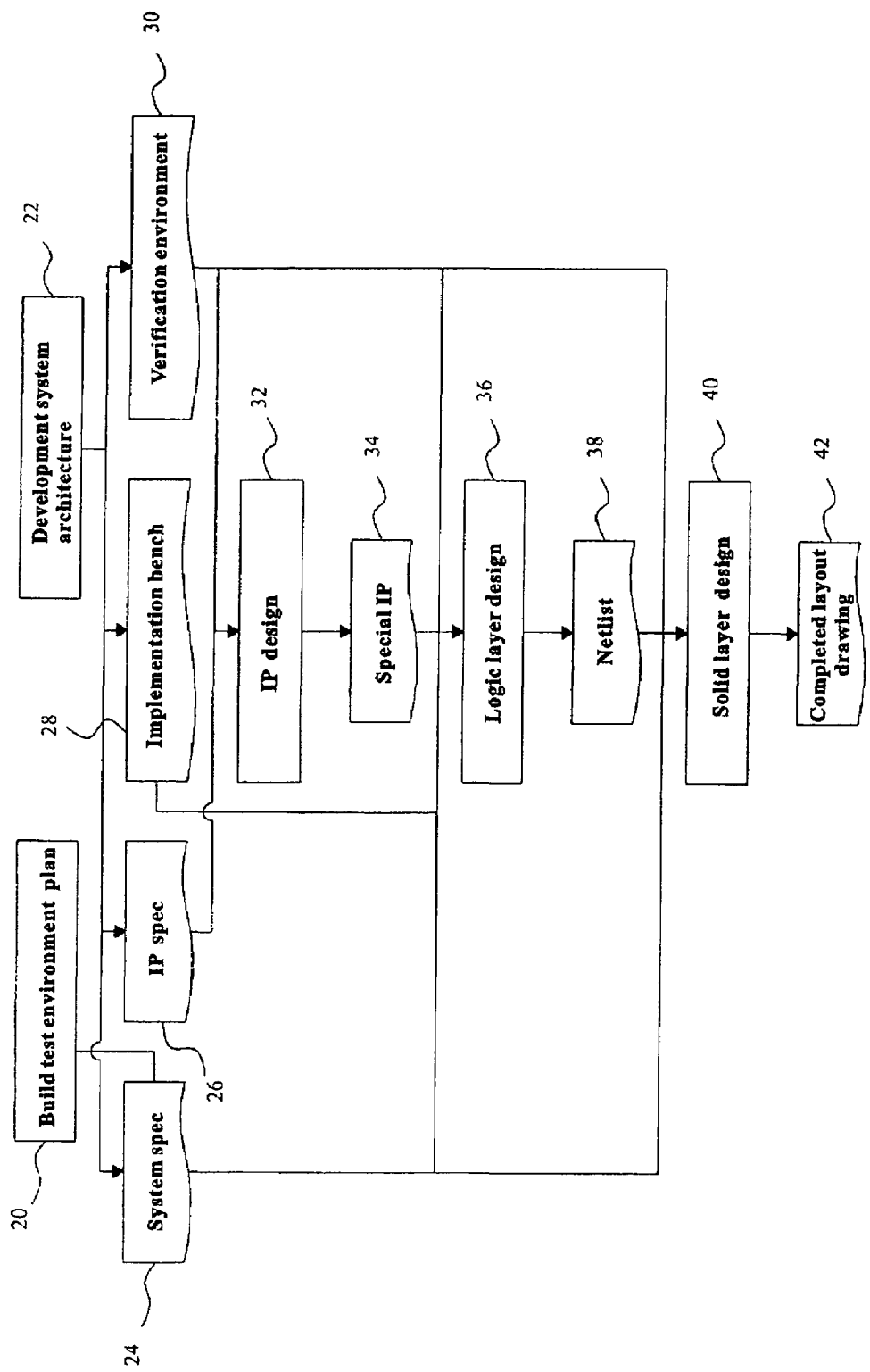
FIG. 2 is the overall design process flow of the current invention.
Figure 3:
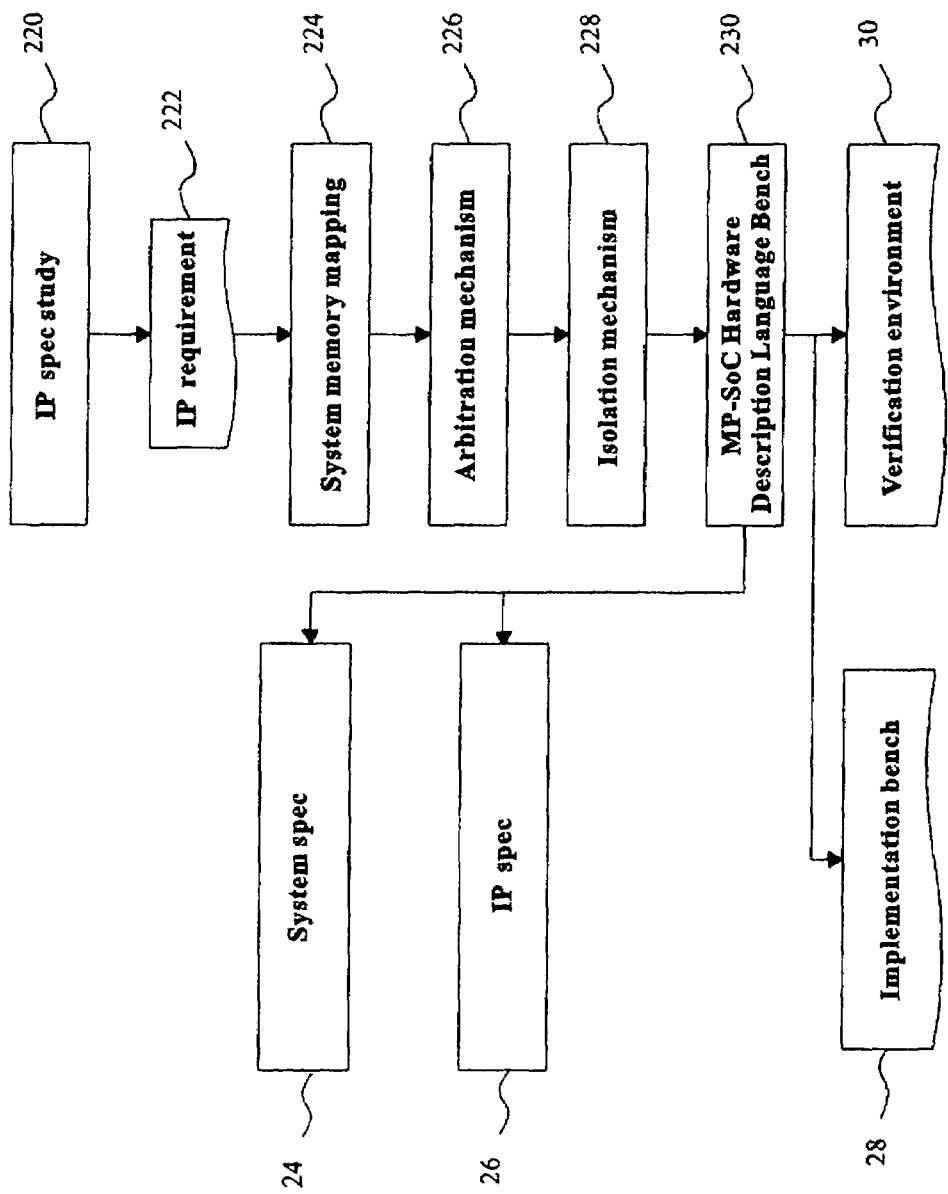
FIG. 3 is the design process flow of system architecture of one embodiment of the current invention.
Figure 4:
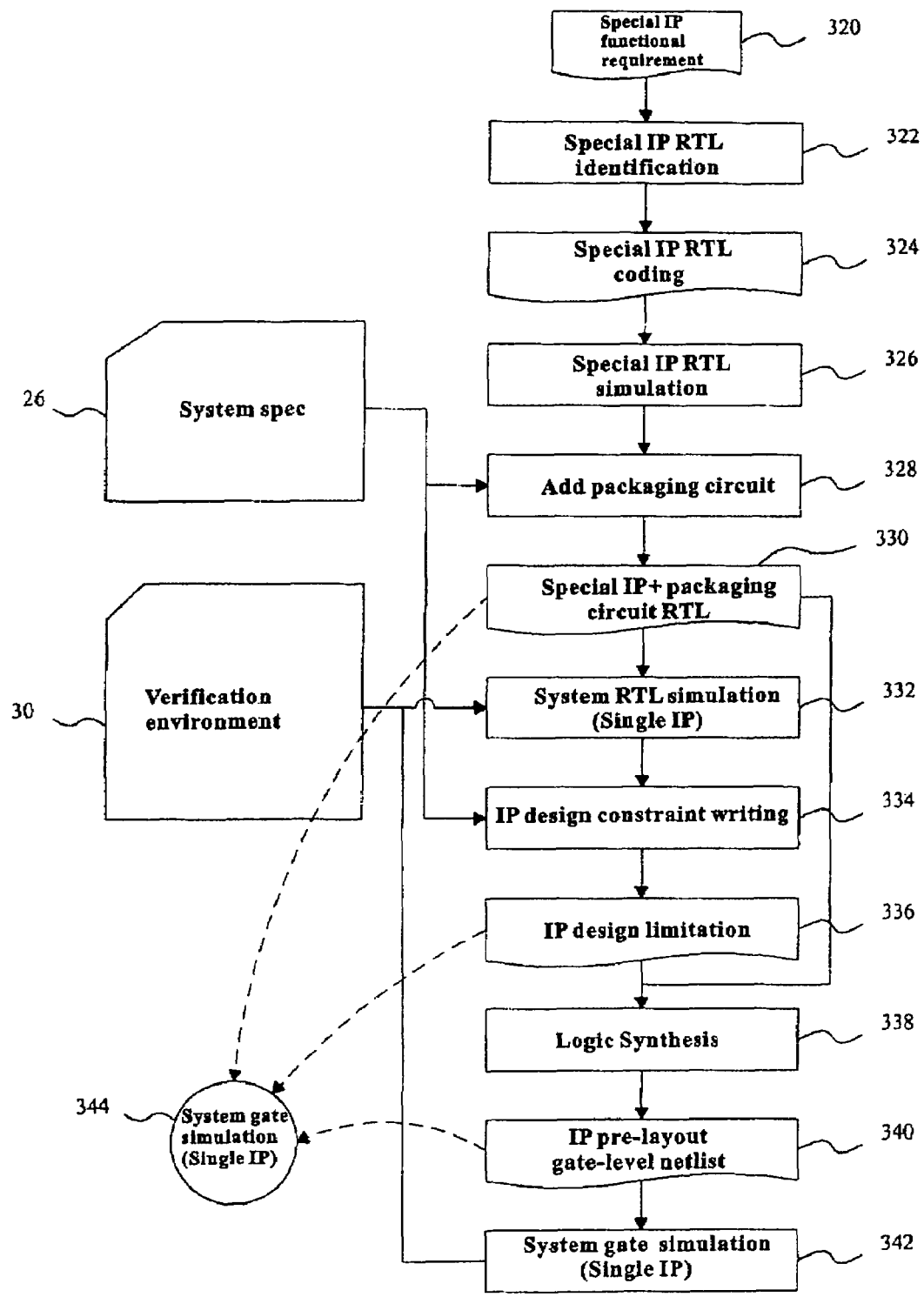
FIG. 4 is the IP block design process flow of the embodiment in FIG. 3.
Figure 5:
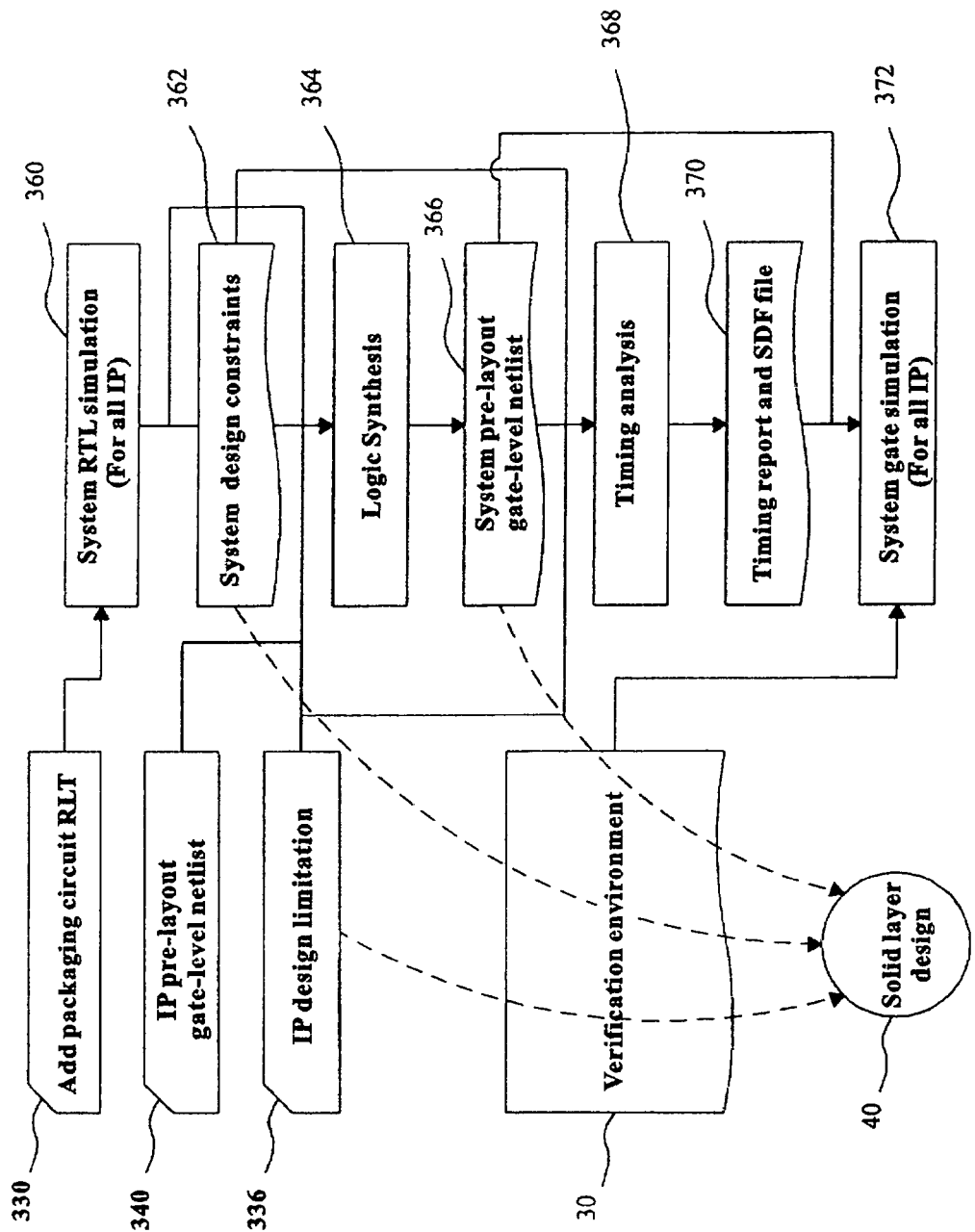
FIG. 5 is the logic layer design process flow of the embodiment in FIG. 3.
Figure 6:
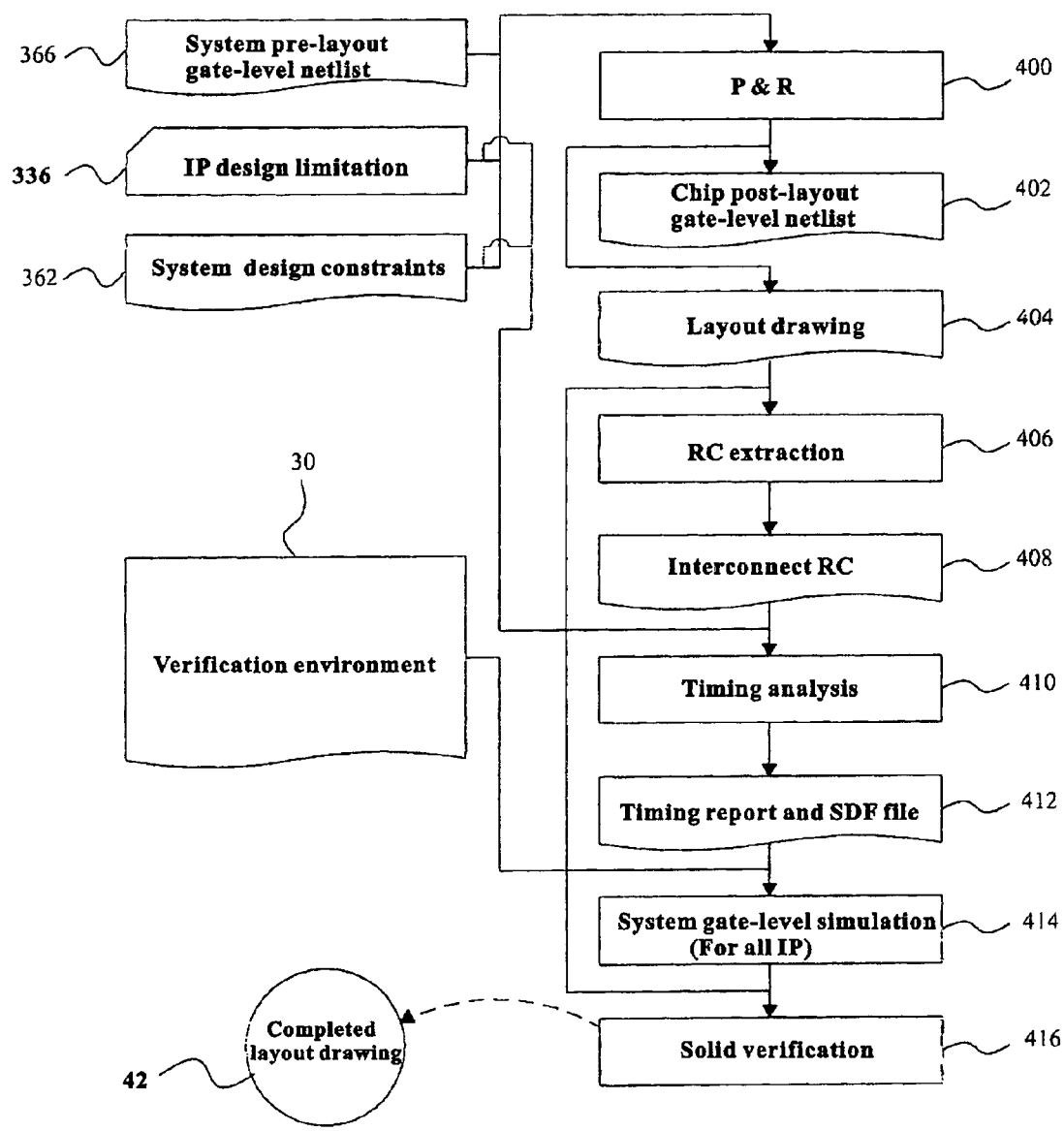
FIG. 6 is the solid layer design process flow of the embodiment in FIG. 3.
Figure 7:
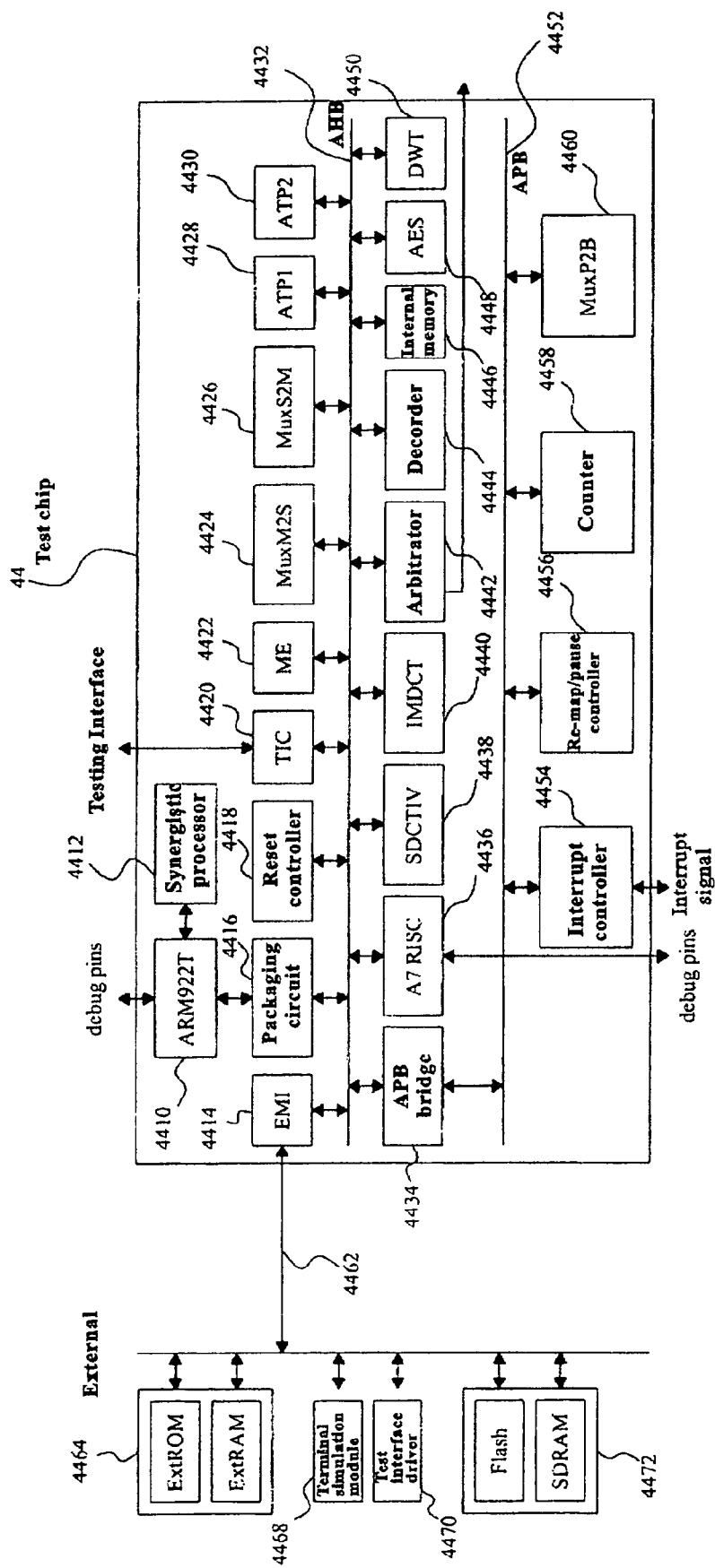
FIG. 7 is the system block diagram of the test chip designed from the embodiment of FIG. 3.
Figure 8:
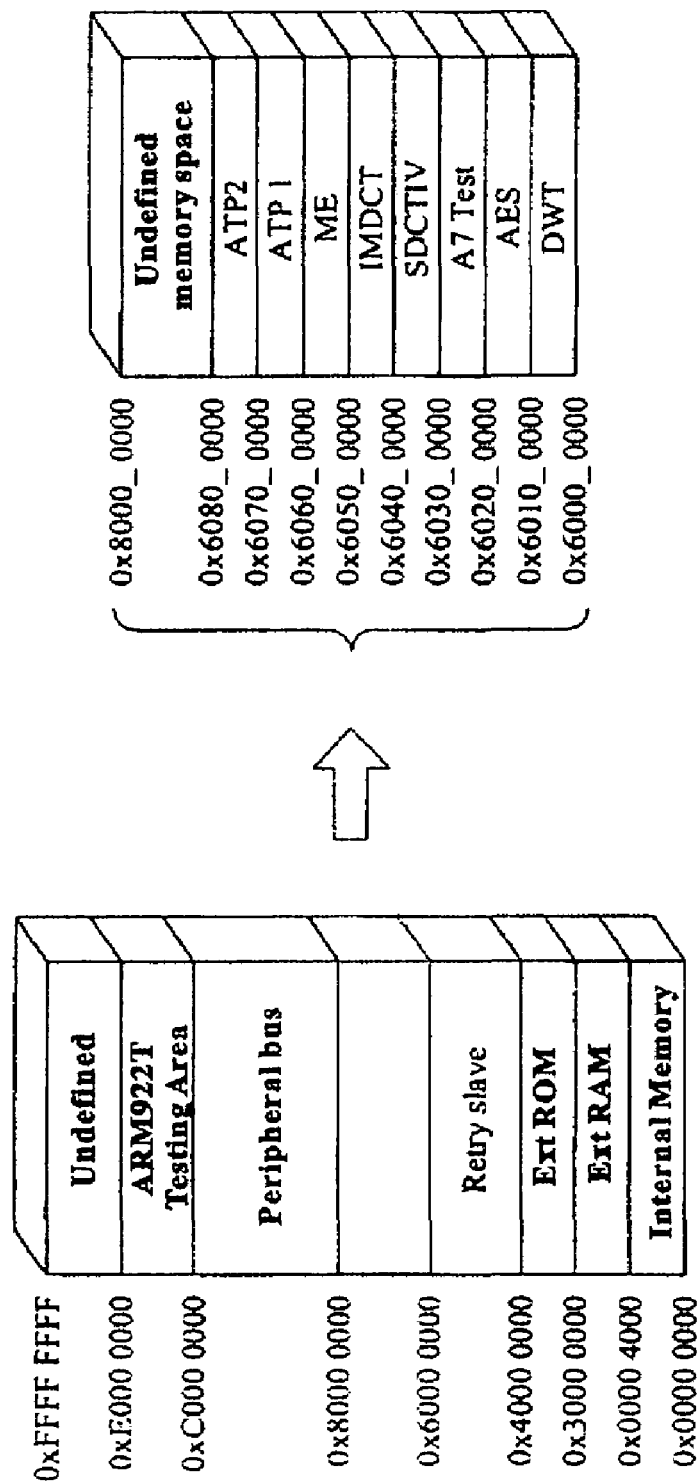
FIG. 8 is the system memory mapping of the test chip of FIG. 7.
Figure 9:
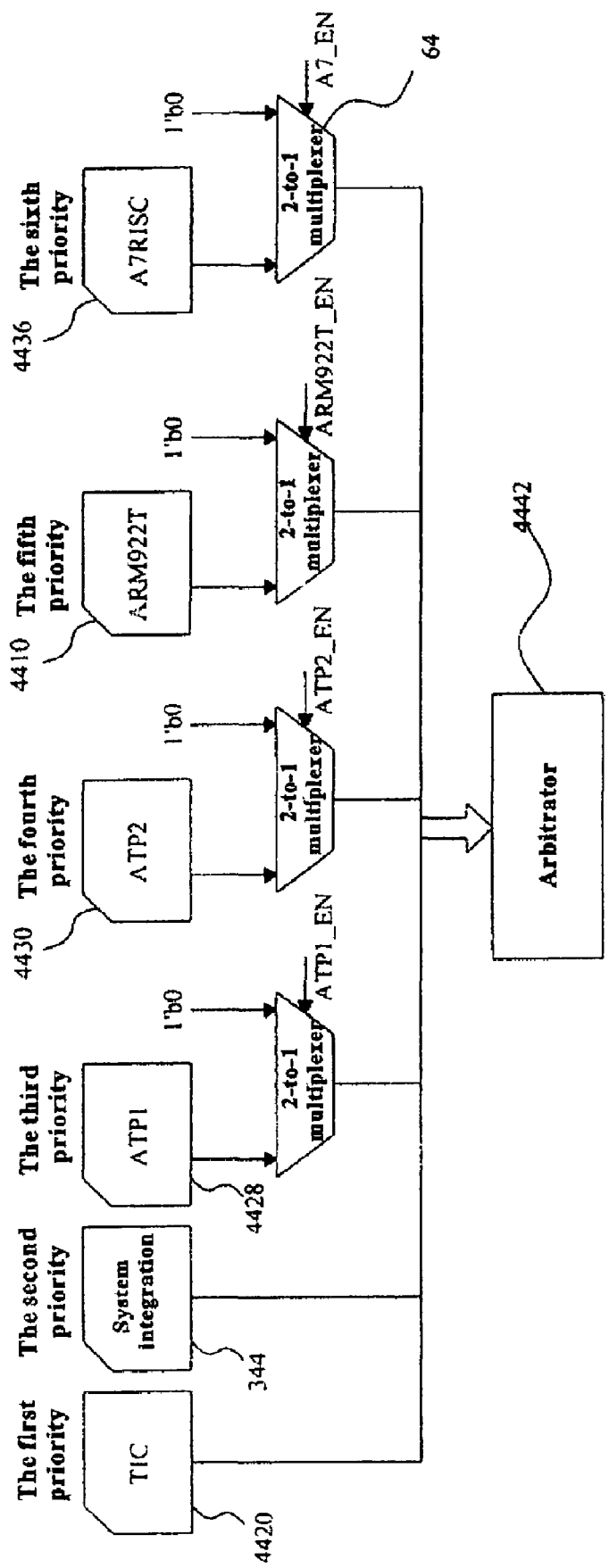
FIG. 9 is the isolation mechanism of test chip of FIG. 7.
Figure 10:
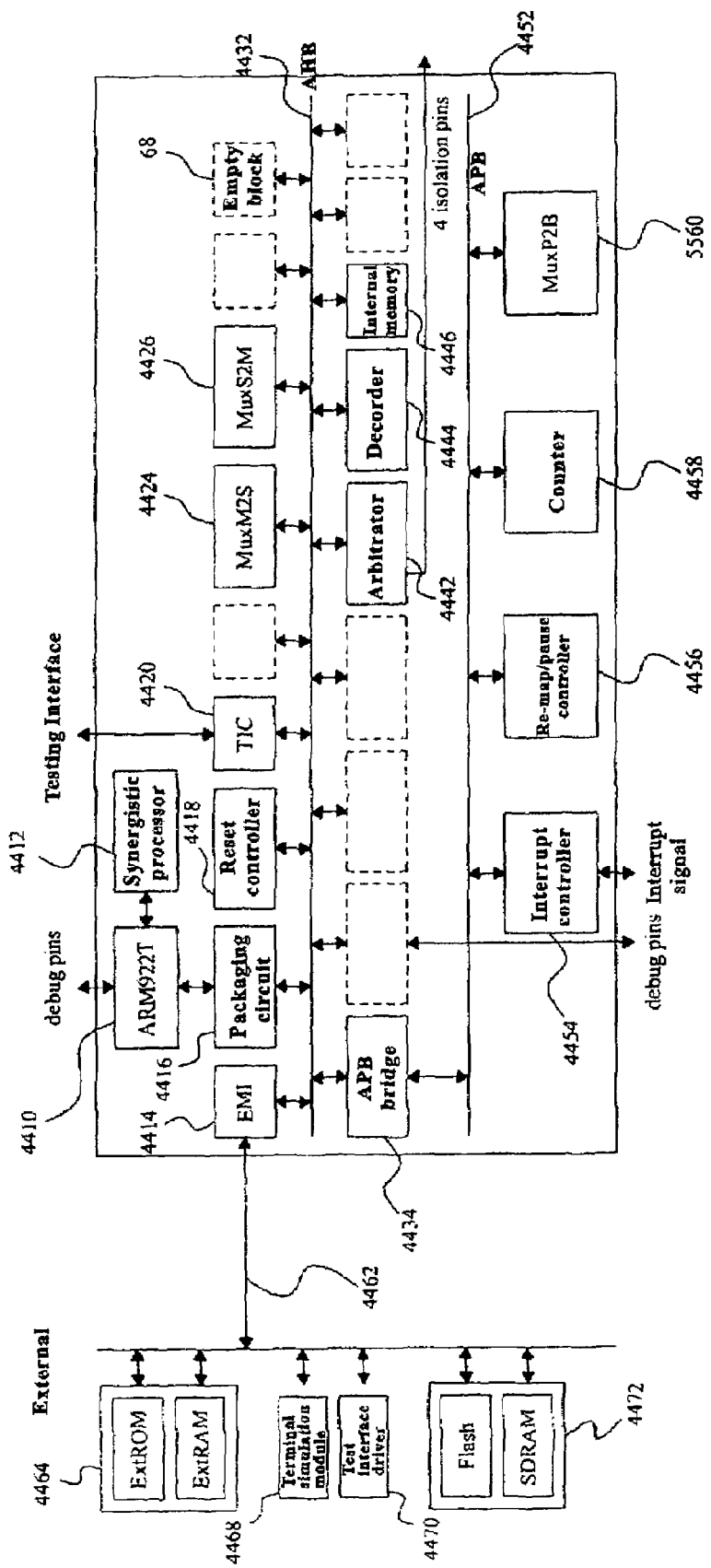
FIG. 10 is the practical implementation bench of the embodiment of FIG. 3.
Figure 11:
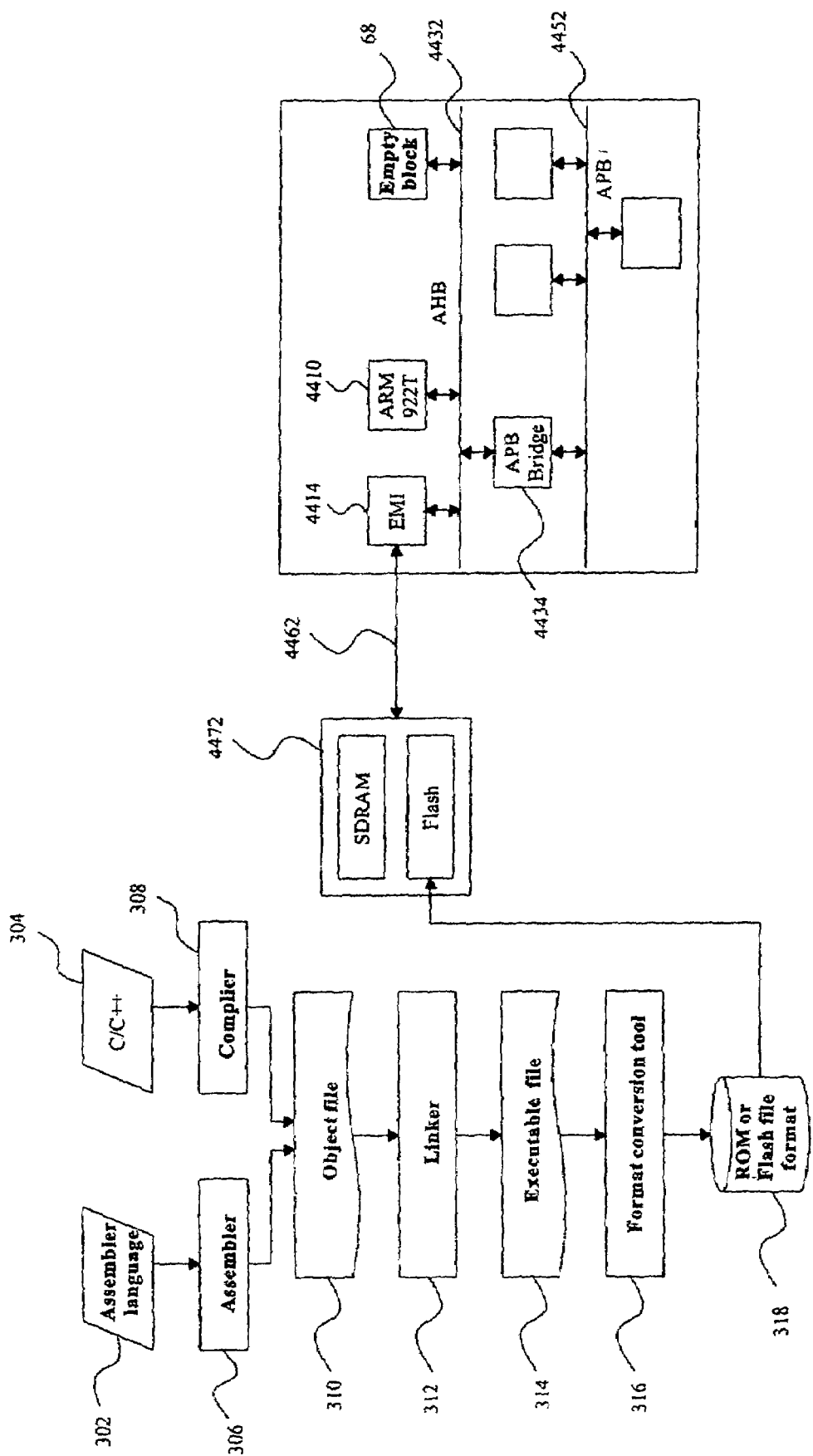
FIG. 11 is the verification environment of the embodiment of FIG. 3.
Figure 12:
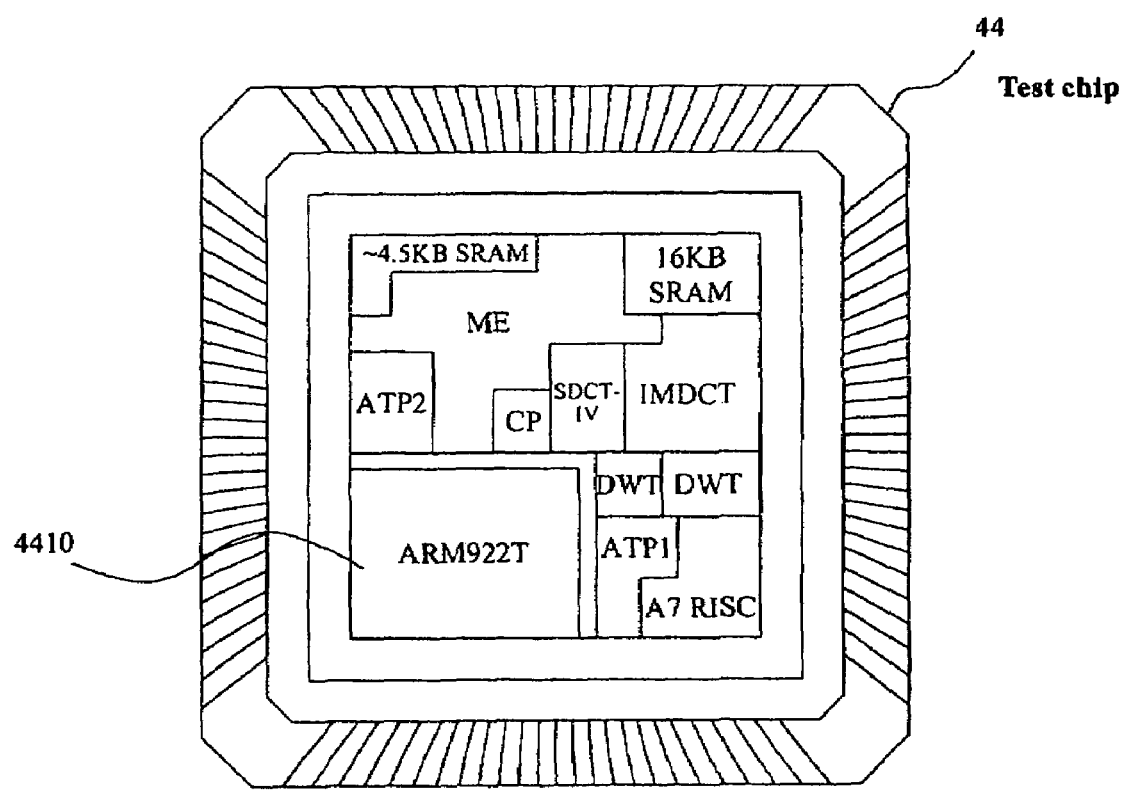
FIG. 12 is the photo of test chip of FIG. 7.
Figure 13:
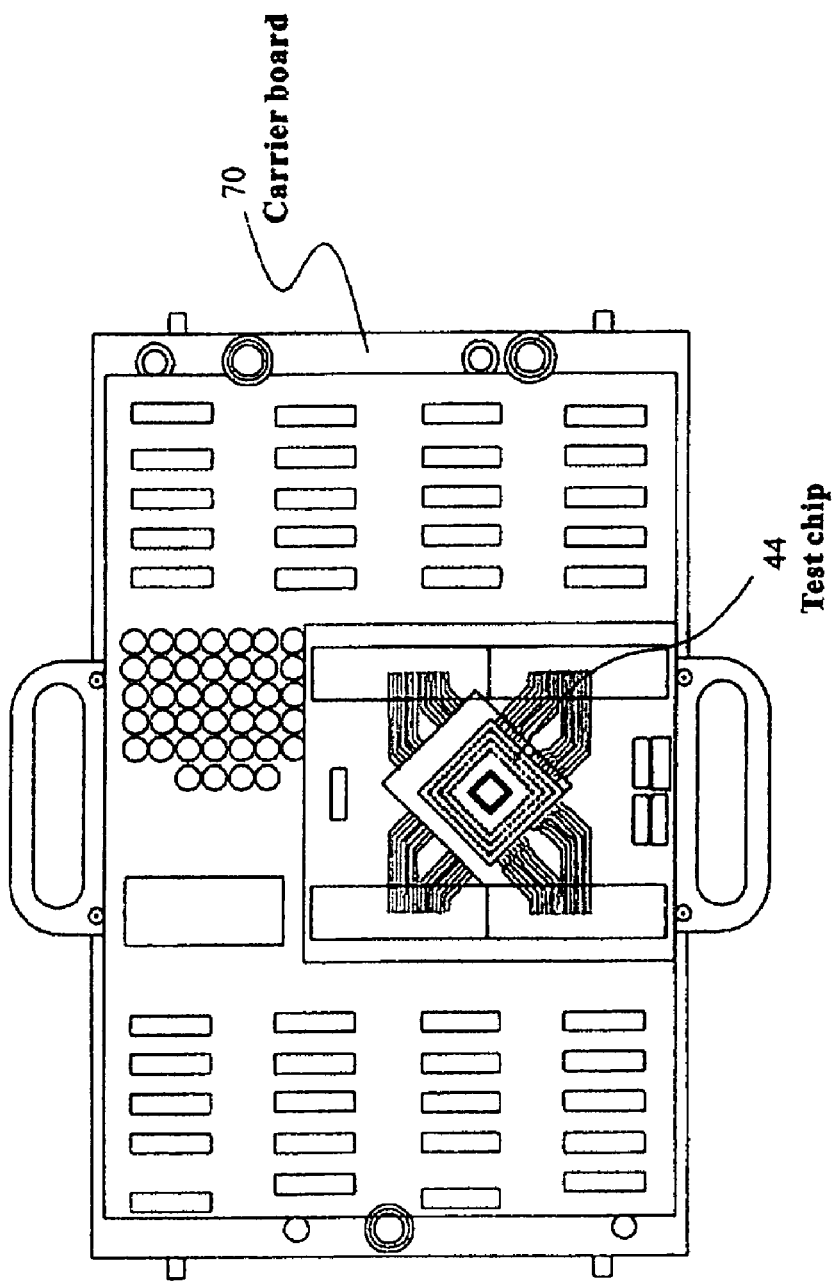
FIG. 13 is the photo of test chip of ATE test diagram 7.
Figure 14:
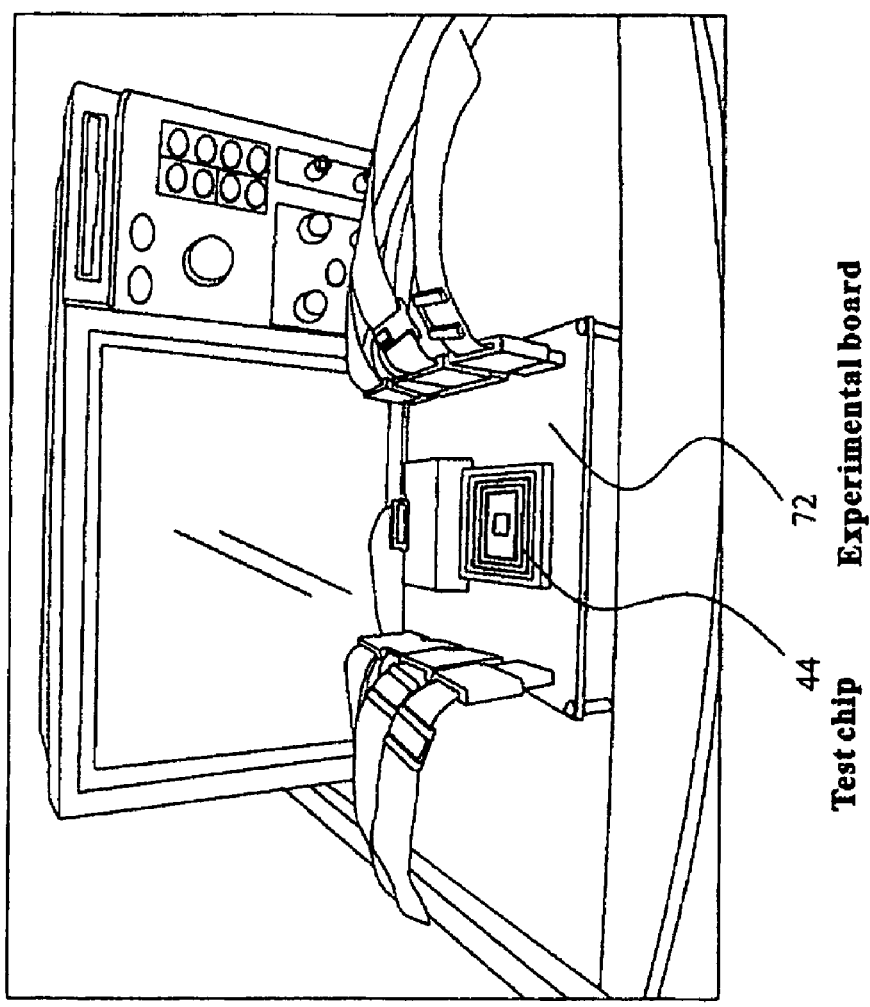
FIG. 14 is the photo of test chip of test diagram 7 of experimental board.

| | Symbol description of main components |
| --- | --- |
| 10 | System-on-chip project |
| 12 | Special IP zone |
| 14 | Share zone |
| 20 | build test environment plan |
| 22 | development system architecture |
| 220 | IP spec study |
| 222 | IP requirement |
| 224 | System memory mapping |
| 226 | Arbitration mechanism |
| 228 | Isolation mechanism |
| 230 | MP-SoC Hardware Description Language Bench |
| 24 | System spec |
| 26 | IP spec |
| 28 | Implementation bench |
| 30 | Verification environment |
| 302 | Assembler language |
| 304 | C language |
| 306 | Assembler |
| 308 | Complier |
| 310 | Object file |
| 312 | Linker |
| 314 | Executable file |
| 316 | Format conversion tool |
| 318 | ROM or Flash file format |
| 32 | IP design |
| 320 | Special IP functional requirement |
| 322 | Special IP RTL identification |
| 324 | Special IP RTL coding |
| 326 | Special IP RTL simulation |
| 328 | Add packaging circuit |
| 330 | Special IP + packaging circuit RTL |
| 332 | System RTL simulation (Single IP) |
| 334 | IP design constraint writing |
| 336 | IP design limitation |
| 338 | Logic synthesis |
| 34 | Special IP |
| 340 | IP pre-layout gate-level netlist |
| 342 | System gate simulation (Single IP) |
| 344 | System integration |
| 36 | Logic layer design |
| 360 | System RTL simulation (For all IP) |
| 362 | System design constraints |
| 364 | Logic synthesis |
| 366 | System pre-layout gate-level netlist |
| 368 | Timing analysis |
| 370 | Timing report and SDF file |
| 372 | System gate simulation (For all IP) |
| 38 | Netlist |
| 40 | Solid layer design |
| 400 | P&R |
| 402 | Chip post-layout gate-level netlist |
| 404 | Layout drawing |
| 406 | RC extraction |
| 408 | Interconnect RC |
| 410 | Timing analysis |
| 412 | Timing report and SDF file |
| 414 | System gate-level simulation (For all IP) |
| 416 | Solid verification |
| 42 | Completed layout drawing |
| 44 | Test chip |

-continued

| | Symbol description of main components |
|---|---|
| 4410 | ARM922T core processor |
| 4412 | Synergistic processor |
| 4414 | External memory interface |
| 4416 | Packaging circuit |
| 4418 | Reset controller |
| 4420 | Test interface controller |
| 4422 | ME processing core |
| 4424 | MuxM2S |
| 4426 | MuxS2M |
| 4428 | ATP1 |
| 4430 | ATP2 |
| 4432 | AHB |
| 4434 | APB bridge |
| 4436 | A7 RISC processor |
| 4438 | SDCTIV processing core |
| 4440 | IMDCT processing core |
| 4442 | Arbitrator |
| 4444 | Decoder |
| 4446 | Internal memory |
| 4448 | AES processing core |
| 4450 | DWT processing core |
| 4452 | APB |
| 4454 | Interrupt controller |
| 4456 | Re-map/pause controller |
| 4458 | Counter |
| 4460 | MuxP2B |
| 4462 | External bus |
| 4464 | External memory |
| 4468 | Terminal simulation module |
| 4470 | Test interface driver |
| 4472 | External memory |
| 64 | 2-to-1 multiplexer |
| 68 | Empty block |
| 70 | Carrier board |
| 72 | Experimental board |

What is claimed is:

1. A method for designing multi-projects system-on-chip bench, wherein the bench integrates multiple system-on-chip projects, and comprises multiple silicon intellectual property blocks to be installed with special intellectual properties by the system-on-chip projects, the method comprising using a computer to perform the following steps:

building verification environment plan;
developing system architecture and defining hardware component and interface on the bench;
designing an implementation bench according to the system architecture;
making a verification environment according to the system architecture;
planning system spec and silicon intellectual property spec according to the verification environment plan and the system architecture;
designing the special silicon intellectual property blocks according to the system spec and the silicon intellectual property spec;
integrating the special silicon intellectual property blocks into the implementation bench;
performing logic level design according to the integrated implementation bench for the special silicon intellectual property blocks and generating a netlist; and
performing solid level design according to the logic level design and generating the multi-projects system-on-chip bench.

2. The method of claim 1, further comprising using the verification environment plan to verify the special silicon intellectual property blocks so as to ensure that each special silicon intellectual property block operates properly on the implementation bench.

3. The method of claim 1, wherein the steps of developing system architecture comprising of:

studying the system requirements of the special silicon intellectual properties;
building a system memory mapping according to the system requirements;
planning arbitration mechanism according the system requirements; and
planning isolation mechanism according to the system requirements.

4. The method of claim 3, wherein the steps of studying the system requirements of the special silicon intellectual properties comprising studying needed memory space, internal memory size and a lead count for operation of each special silicon intellectual property.

* * * * *